No. 697,118. Patented Apr. 8, 1902.
C. B. VAN HORN.
FELLY FOR VEHICLE WHEELS.
(Application filed Dec. 3, 1900. Renewed Mar. 5, 1902.)
(No Model.) 2 Sheets—Sheet 1.

Witnesses:
Inventor:
Charles B. Van Horn,

No. 697,118. Patented Apr. 8, 1902.
C. B. VAN HORN.
FELLY FOR VEHICLE WHEELS.
(Application filed Dec. 3, 1900. Renewed Mar. 5, 1902.)
(No Model.) 2 Sheets—Sheet 2.
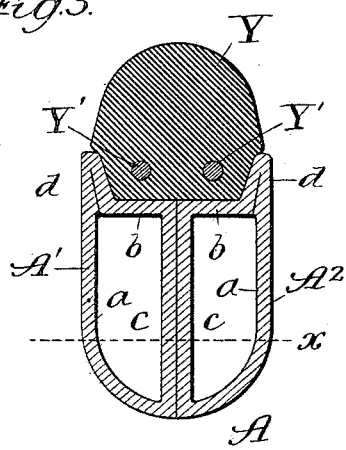
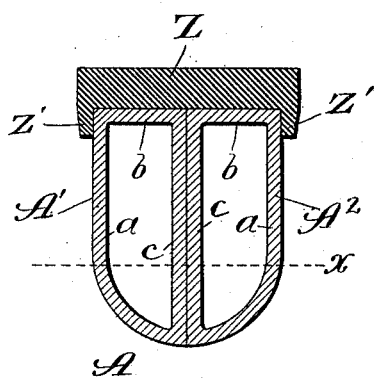
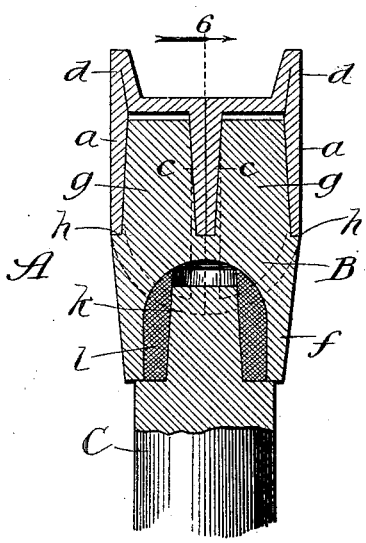
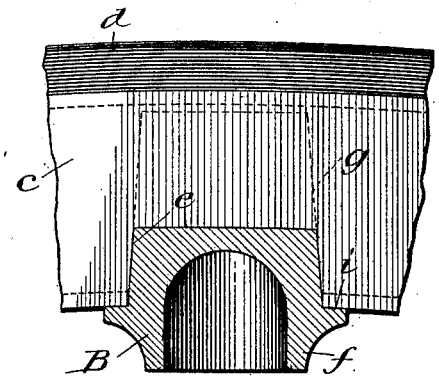
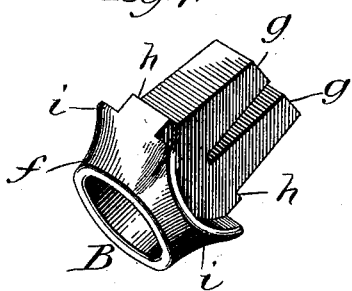
Witnesses:
Inventor:
Charles B. Van Horn,

UNITED STATES PATENT OFFICE.

CHARLES B. VAN HORN, OF PHILADELPHIA, PENNSYLVANIA.

FELLY FOR VEHICLE-WHEELS.

SPECIFICATION forming part of Letters Patent No. 697,118, dated April 8, 1902.

Application filed December 3, 1900. Renewed March 5, 1902. Serial No. 96,843. (No model.)

*To all whom it may concern:*

Be it known that I, CHARLES B. VAN HORN, a citizen of the United States, residing at Philadelphia, in the county of Philadelphia and State of Pennsylvania, have invented a new and useful Improvement in Fellies, of which the following is a specification.

My invention relates to an improvement in the construction of fellies for wheels generally, and more especially for vehicle-wheels.

In the application for Letters Patent filed by me February 9, 1900, Serial No. 4,655, I have shown, described, and claimed a wheel having an expansible hub, spokes which are tightened in place by the expansion of the hub, and a hollow metal felly provided with an internal bracing-flange and spoke-tenon sockets; and the present invention is more particularly in the nature of an improvement upon the construction of the said felly, as well as in the method of its manufacture.

My object is to provide a felly formed of separable members so arranged that the labor of placing an endless tire thereon may be performed with comparative ease and which shall contribute to the production of a particularly strong, durable, and inexpensive wheel.

Figure 1:
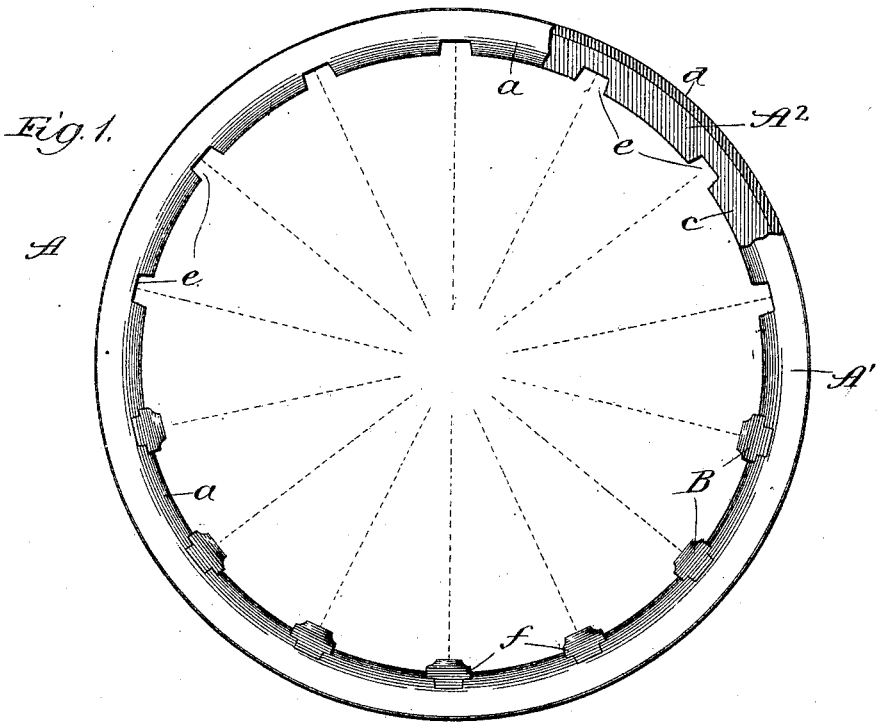
Figure 2:
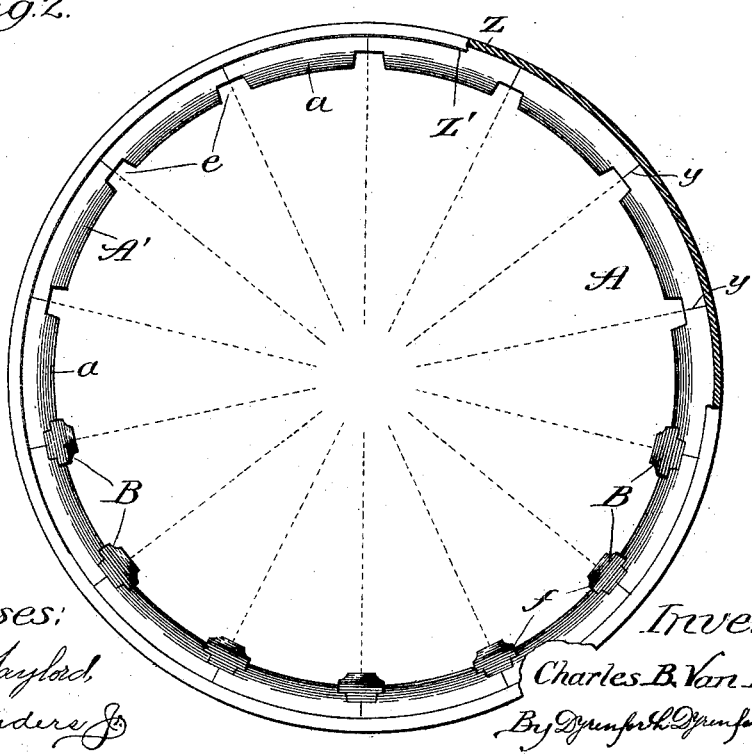

Referring to the drawings, Figure 1 is a side elevation of an endless felly of my improved construction with a part of one member broken away. The lower part of the wheel is provided with spoke-tenon socket-pieces, and the spokes are indicated by dotted radial lines. Fig. 2 is a view of the same nature as Fig. 1, but showing the felly formed of segments for use more especially with an endless metal tire. Fig. 3 is a cross-section of a felly of the construction shown in Fig. 1 enlarged and provided with a rubber tire; Fig. 4, a similar view of a felly of the construction shown in Fig. 2 and provided with an endless metal tire; Fig. 5, a cross-section of the felly shown in Figs. 1 and 3, the section being taken at one of the spoke-sockets with the socket-piece in place and showing the end of a spoke and a spoke-tenon and spoke-tenon bushing; Fig. 6, a section taken on line 6 of Fig. 5 and showing the head of a socket-piece in section, and Fig. 7 a perspective view of one of the spoke-tenon socket-pieces.

A is a felly formed of two corresponding tubular members $A'$ and $A^2$. Each member has an outer wall $a$, flat top wall $b$, and an inner bracing wall or flange $c$, and the members fit together along the faces of their bracing-walls to form the felly. In the construction shown in Figs. 1, 3, 5, and 6, which is adapted to receive a rubber tire, each of the members of the felly has a flange $d$. At desired intervals the inner peripheral portion of the felly is cut away to produce the spoke-sockets $e$, the cuts being upon the dotted lines $x$ in Figs. 3 and 4 and extending through the parts $a$ and $c$ of the felly members. The cut-away portions in the felly members register with each other to produce the sockets $e$, as shown.

B B are the spoke-tenon socket-pieces, which serve to receive the spoke-tenons and also serve to hold or clamp the felly members together. Each socket-piece is formed with a head $f$ and a bifurcated shank $g$. The shank $g$ is of a size to fit into the cut-away portion or socket $e$, the prongs on the shank $g$ embracing the brace-flanges $c$, as shown in Fig. 5. Preferably the slit or open space which separates the prongs is rendered slightly flaring, so that as the socket-pieces are pressed into place they serve to squeeze the brace-flanges $c$ of the felly members, and thus tighten and hold the members together. At the sides of the shank $g$ are shoulders $h\,h$, which extend over the edges of the sides $a\,a$ of the felly, and at opposite ends of the head $f$ are curved projections $i\,i$, which fit over the curved inner peripheral sides of the felly members. The spokes C are provided at their tenons $k$ with bushings $l$, which may be of wood fiber or other suitable material.

As the expansible hub and spokes of the wheel form no part of the present invention, it is not thought necessary to illustrate them. Any suitable form of expansible hub may be employed wherein the building up of the wheel is performed by placing the spokes in the spoke-tenon sockets, then expanding the hub to force the spokes radially and tighten them in sockets. To place a rubber tire Y upon a wheel, it has been usual hitherto to provide the same in one, not endless, strip, pass it around the felly, and then braze or otherwise fasten together the ends of the tireholding wires Y'. This has always been a difficult operation, requiring skill and special facilities. In placing such a tire upon my improved felly the wheel may be taken apart and the spokes and spoke-tenon socket-pieces removed, whereby the felly members may be separated from each other. An endless tire Y may then be passed over the part $b$ of one member and the other member brought into position within the inner periphery of the tire, the two members being clamped by the placing in position of the socket-pieces B. The spokes C, with their bushings $l$, are then passed into the socket-pieces and the hub placed in position and expanded to tighten the spokes and complete the wheel. The tire will thus be held securely and the felly members fastened rigidly to each other and to the spokes. In the use of the solid metal tire Z, as illustrated in Figs. 2 and 4, I prefer to provide the felly in segments divided at the lines $y$ in Fig. 2. The tire Z should have flanges Z' to embrace the felly. The manner of building up the wheel shown in Fig. 2 is obvious, the socket-pieces B operating to fasten the parallel felly members together, as before described, and also to hold them at their ends against play. The solid metal tire operates to hold the felly-segments against separation.

In forming the felly members A' A², I practice the following method: I take a tube of metal of the proper thickness and diameter and pass it between forming-rolls, which shape it with the flat parts $b$ and $c$ and rounded part $a$. In the case of the felly for rubber tires the rolls through which the tube passes also form the flanges $d$. The tube thus operated upon may be an endless one of the proper length or it may be bent longitudinally into annular form as it passes through the shaping-rolls. When the felly-sections are formed each in one piece, their ends may be brazed or otherwise secured together to render them endless. The sockets $e$ may be formed by cuts made in the felly members after they have passed through the shaping-rolls. In forming the segmental felly members (illustrated in Fig. 2) the segments may be formed separately or they may be cut apart after shaping a continuous felly member, as before described.

What I claim as new, and desire to secure by Letters Patent, is—

1. In a felly, parallel, longitudinally-extending tubular metal felly members each having the inner bracing-wall, outer side wall, and tire-receiving face between said walls.

2. In a felly, parallel, longitudinally-extending tubular metal felly members each having the inner bracing-wall, outer side wall, tire-receiving face between said walls, and tire-retaining flange.

3. In a felly, parallel, longitudinally-extending tubular metal felly members each having the inner bracing-wall, outer side wall, tire-receiving face between said walls, and spoke-sockets in said walls.

4. In a felly, the combination of parallel metal felly members having spoke-sockets, and spoke-tenon socket-pieces having prongs confined in said spoke-sockets.

5. In a felly, the combination of tubular metal felly members having spoke-sockets, and spoke-tenon socket-pieces having prongs confined in said spoke-sockets and clamping said members together.

6. In a felly, the corresponding tubular members each having one of its sides forming an inner bracing-wall.

7. In a felly, the corresponding tubular members formed with inner bracing-walls, and removable spoke-tenon socket-pieces engaging said members.

8. In a felly, the corresponding tubular members formed with inner bracing-walls, and removable spoke-tenon socket-pieces clamping said members against separation.

9. In a felly, the corresponding tubular members having corresponding sockets and inner bracing-walls having longitudinal flat sides, and spoke-tenon socket-pieces in said sockets.

10. In a felly, the corresponding tubular members having corresponding sockets and inner bracing-walls having longitudinal flat sides, and removable spoke-tenon socket-pieces fitting said sockets and engaging said bracing-walls to clamp said members together.

11. In a felly, the combination of corresponding tubular felly members having corresponding sockets and inner bracing-walls and removable spoke-tenon socket-pieces having prongs entering said sockets and embracing said walls.

12. In a felly, the combination of corresponding tubular felly members having corresponding sockets and inner bracing-walls, and removable spoke-tenon socket-pieces having heads fitting against said members and having prongs entering said sockets and embracing said bracing-walls.

CHARLES B. VAN HORN.

In presence of—
D. W. LEE,
ALBERT D. BACCI.